US008601367B1

(12) United States Patent
Ritz

(10) Patent No.: US 8,601,367 B1
(45) Date of Patent: Dec. 3, 2013

(54) SYSTEMS AND METHODS FOR GENERATING FILING DOCUMENTS IN A VISUAL PRESENTATION CONTEXT WITH XBRL BARCODE AUTHENTICATION

(71) Applicant: WebFilings LLC, Los Altos, CA (US)

(72) Inventor: Dean Anthony Ritz, Vashon, WA (US)

(73) Assignee: WebFilings LLC, Ames, IA (US)

( * ) Notice: Subject to any disclaimer, the term of this patent is extended or adjusted under 35 U.S.C. 154(b) by 0 days.

(21) Appl. No.: 13/768,655

(22) Filed: Feb. 15, 2013

(51) Int. Cl.
*G06F 17/00* (2006.01)
(52) U.S. Cl.
USPC .......................................................... 715/234
(58) Field of Classification Search
USPC .......................................................... 715/234
See application file for complete search history.

(56) References Cited

U.S. PATENT DOCUMENTS

| | | | | |
|---|---|---|---|---|
| 7,640,318 B1* | 12/2009 | Hull et al. | ...................... | 709/217 |
| 2005/0144096 A1* | 6/2005 | Caramanna et al. | ............ | 705/30 |
| 2005/0262089 A1* | 11/2005 | Wu | ................. | 707/10 |
| 2006/0184539 A1* | 8/2006 | Blake et al. | ...................... | 707/10 |
| 2006/0230025 A1* | 10/2006 | Baelen | ................. | 707/3 |
| 2006/0242181 A1* | 10/2006 | Mueller-Klingspor | ....... | 707/101 |
| 2007/0022093 A1* | 1/2007 | Wyatt et al. | ........................ | 707/2 |
| 2007/0050702 A1* | 3/2007 | Chopin et al. | ................ | 715/507 |
| 2007/0078877 A1* | 4/2007 | Ungar et al. | ................... | 707/101 |
| 2007/0136352 A1* | 6/2007 | Chape et al. | ................... | 707/102 |
| 2007/0162362 A1* | 7/2007 | Yamagishi et al. | ............. | 705/30 |
| 2007/0192265 A1* | 8/2007 | Chopin et al. | .................. | 706/20 |
| 2008/0059482 A1* | 3/2008 | Rohan et al. | ..................... | 707/10 |
| 2008/0147601 A1* | 6/2008 | Chapus et al. | .................... | 707/3 |
| 2008/0201319 A1* | 8/2008 | McNamar | .......................... | 707/5 |
| 2008/0250157 A1* | 10/2008 | Ohata | ........................... | 709/236 |
| 2009/0006472 A1* | 1/2009 | Bush et al. | .................. | 707/104.1 |
| 2009/0019358 A1* | 1/2009 | Blake et al. | .................... | 715/234 |
| 2009/0300482 A1* | 12/2009 | Summers et al. | ............. | 715/234 |
| 2010/0031141 A1* | 2/2010 | Summers et al. | ............. | 715/239 |
| 2010/0121883 A1* | 5/2010 | Cutting et al. | ................ | 707/791 |
| 2011/0137923 A1* | 6/2011 | Koroteyev et al. | ............ | 707/756 |
| 2011/0231748 A1* | 9/2011 | Chopin et al. | ................ | 715/212 |
| 2011/0258167 A1* | 10/2011 | Binstock et al. | .............. | 707/690 |
| 2011/0276873 A1* | 11/2011 | Gorur et al. | .................... | 715/234 |
| 2012/0011118 A1* | 1/2012 | Gleicher et al. | .............. | 707/736 |

(Continued)

OTHER PUBLICATIONS

Williams et al., Online Business Reporting: an Information Management Perspective, Elsevier, International Journal of Information Management vol. 26 No. 2, Apr. 2006, p. 91-101.*

(Continued)

*Primary Examiner* — Frank D Mills
(74) *Attorney, Agent, or Firm* — Drinker Biddle & Reath LLP

(57) ABSTRACT

Embodiments are disclosed for the preparation, validation, and dissemination of XBRL based documents and reports. An embodiment system includes a user input device, an editing system, a data store, a validation system, and a publishing system. The user input device is configured to accept numerical and textual input from existing spreadsheet and word processing systems. The editing system provides functionality to generate a first XBRL based document including numerical and textual data, and, based on user input, to generate one or more additional XBRL based documents from the first document. The data store is configured to store source files associated with the corresponding XBRL based documents. The validation system is configured to validate, identify, and correct errors in XBRL based documents. The publishing system is configured to provide access to XBRL based documents over the internet and generate a reference locator to be used to access the documents.

21 Claims, 5 Drawing Sheets

(56) References Cited

U.S. PATENT DOCUMENTS

2012/0239610 A1* 9/2012 Binstock et al. .............. 707/602
2012/0239611 A1* 9/2012 Binstock et al. .............. 707/602
2013/0018923 A1* 1/2013 Ferris et al. .................. 707/803
2013/0031117 A1* 1/2013 Mandelstein et al. ........ 707/758
2013/0041793 A1* 2/2013 Kashima et al. ................ 705/30
2013/0110686 A1* 5/2013 Berrington et al. ............. 705/30

OTHER PUBLICATIONS

Boritz et al., The SEC'S XBRL Voluntary Filing Program on Edgar: a Case for Quality Assurance, American Accounting Association, Current Issues in Auditing, vol. 2 No. 2, Jan. 2009, p. A36-A50.*

* cited by examiner

SYSTEMS AND METHODS FOR GENERATING FILING DOCUMENTS IN A VISUAL PRESENTATION CONTEXT WITH XBRL BARCODE AUTHENTICATION

BACKGROUND

1. Field

Embodiments generally relate to reporting of business data in documents using the eXtensible Business Reporting Language (XBRL).

2. Related Art

XBRL is a standardized computer language by which businesses may efficiently and accurately communicate business data with each other and with regulating agencies. XBRL enables the association of data tags to describe information in a company's financial statements. This process, commonly called "tagging," associates data values with metadata (additional information about the data). The information can then be searched, reorganized for analytical purposes, and processed into human readable formats such as spreadsheets or other tabular renderings. XBRL also allows financial statements in foreign languages to be translated into English, and vice versa.

For publicly-held companies that file reports with the U.S. Securities and Exchange Commission (SEC), for example, financial statements must be tagged using XBRL. XBRL tagging is now a key part of the financial statement production process. The SEC requirements, covering interactive data reporting using XBRL, provide prescribed ways to represent data and its metadata, including rules about how the two should be associated.

The use of XBRL along with other systems, such as the SEC's Electronic Data Gathering, Analysis and Retrieval (EDGAR) system, have facilitated greater transparency in the form of easier access to, and analysis of, financial reports and disclosures. Unfortunately, however, the preparation of documents in these systems is often a laborious and error-prone task. Users face problems associated with the general incompatibility between standard spreadsheet and word processing programs as well as version control problems that arise when multiple users edit the same document. Errors in an XBRL document can also be difficult to detect, understand, and correct. Because of these complexities, the time and expense associated with creating XBRL documents has traditionally been very high.

SUMMARY

There is a need for integrated systems and methods to streamline the preparation, validation, and dissemination of XBRL based documents and reports.

An embodiment system includes a user input device, an editing system, a data store, a validation system, and a publishing system. The user input device is configured to accept numerical and textual input from existing spreadsheet and word processing systems. The editing system provides functionality to generate a first XBRL based document including numerical and textual data, and, based on user input, to generate one or more additional XBRL based documents from the first document. The data store is configured to store source files associated with the corresponding XBRL based documents. The validation system is configured to validate, identify, and correct errors in XBRL based documents. The publishing system is configured to provide access to XBRL based documents over the internet and generate a reference locator such as a URL or visually encoded reference locator such as a Quick Response (QR) code to be used to access the documents.

In a further embodiment, a computer-based method is disclosed. In a first stage, the method includes accepting numerical and/or textual input from at least one of: a user input device, a data file containing spreadsheet based data, and a data file containing word processor based data. In a second stage, the method includes generating a first human readable document(s) including numerical and textual data. A third stage includes generating a first XBRL representation of the first document. In a fourth stage, a second human readable document, based on the first document including a subset of the numerical and textual data from the first document, is generated, wherein the second document is generated based on user input. The method further includes, in a fifth stage, generating a second XBRL representation of the second document and optionally generating an HTML representation of at least one of the first and second documents. Lastly the method includes publishing the documents to provide access to at least one of the first and second documents over the internet, wherein a reference locator is generated that provides validated access to the at least one of the first and second documents in word processor or XBRL representation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

Figure 1:
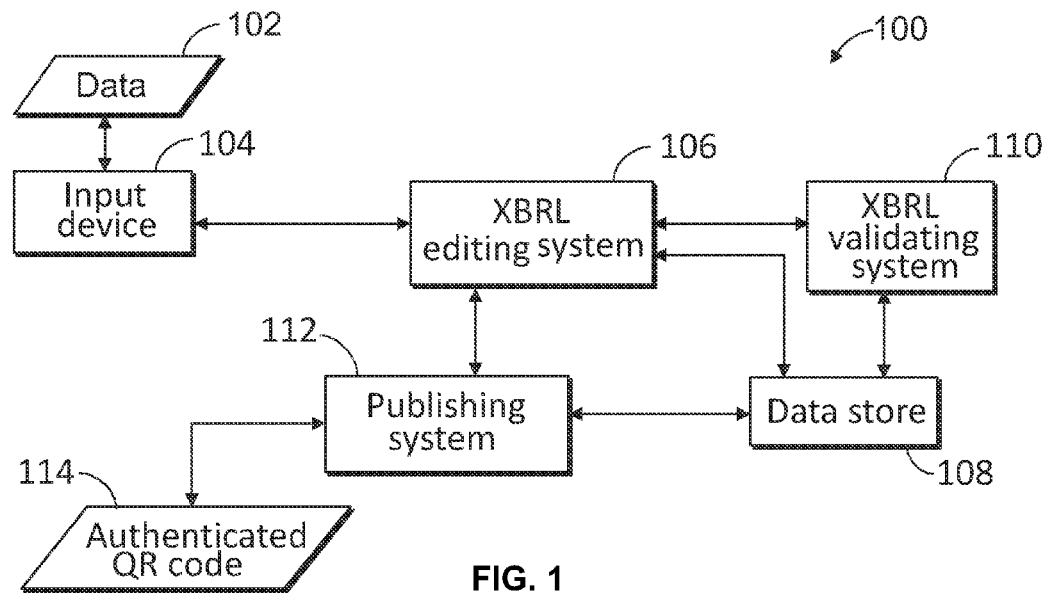
FIG. 1 is a flowchart illustrating an example system for generating and publishing XBRL based documents, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

It is to be appreciated that any additional disclosure found in the figures is meant to be exemplary and not limiting to any of the features shown in the figures and described in the specification below.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but not every embodiment necessarily includes the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In various embodiments, systems and methods are disclosed that provide to a user a convenient data input environment seamlessly combining familiar spreadsheet and word processing tools. With these tools, a user can easily create a variety of financial reports either by directly entering data and text or by cutting and pasting from standard spreadsheet and word processing tools.

These systems and methods are based on a "single document data" model in which data is stored in a single source file that may reside in a remote location on a server or cloud computing environment. Individual data values appearing in a report are associated with links to the source values in the source file. Changes made to a given data value are automatically propagated throughout the report document. For example, a single data value (e.g., a value of sales revenue or other numerical value) may appear in various locations in a report such as individually in a table or as contributing to a value of a sum over a number of terms. When a user changes such a value, all values associated with the changed value (e.g., a sum containing the value) are automatically updated in the report to accurately reflect the change.

The work environment of disclosed embodiments may include a software system executing on a computing processor. The work environment may also include data communications over a computer network, such as WiFi, Ethernet, and the Internet, and both logical and physical data storage devices accessible over the computer network.

A user may interact with the work environment to generate layers of structured data using XBRL without requiring a technical knowledge of XBRL syntax. In the process of layering on this structured data (i.e., tagging) various issues can arise which can be quite technical in nature. These issues can include errors of various types. In embodiments, these technical issues may be addressed within the work environment using multiple layers of checks to validate the XBRL. These multiple layers include both real-time validation and external validation. The real-time validation may be performed within the work environment by working with the internal data structures, for example. The external validation may include use of third party validation tools to perform validation of data files representing the XBRL document created within the work environment. In order to integrate third party validation results into the work environment, embodiments include navigation ties in the data files that relate data items and XBRL syntax within the data file to source documents and XBRL taxonomies within the work environment.

A software solution may output XBRL documents which can be validated by another system in a straightforward manner. For example, such a process may be performed when XBRL filings are prepared and transmitted to the Securities and Exchange Commission. In a manner similar to computer language compilers and software integrated development environments, most existing XBRL validation systems provide technical references back to the calling program with pointers to the source or sources of a problem identified by the validation system as well as a link to a rule or specification which is violated by the XBRL document. Using the information from the validation system, a user of an existing system would manually trace the references (which may be either line numbers or xPath expressions) through the source files to discover the XBRL syntax which caused the problem. This is a daunting task for most preparers of XBRL documents, who find it very challenging to piece together the various hints and attempt to sort out where in the originating system and source files and documents a change needs to be made to correct the problem reported by the validation system. Preparers may never deal directly with technical files themselves, and may not have the technical knowledge required to find and correct the source of the problem.

The XBRL tagging system may perform a large vocabulary translation in order to provide non-technically trained people using the XBRL tagging system with an accurate summary of problems reported by the validation system in layman's terms which the non-technically trained users may understand and be empowered to correct using the XBRL tagging system. The translation facilitates the user to operate at a semantic and domain level, not at a syntax level, in working with XBRL documents.

The various embodiments solve the version control problem by allowing multiple users to simultaneously edit the same document. Each user is enabled to edit a single section of the document at a time. While the section is being edited by one user it appears locked to others while the given user is editing it. In the locked state, only one user can edit a given section at a time. While a particular section is being edited, other users are given access to a read-only version of the locked section. The read only version reflects the state of the section before it was locked. When a user is finished editing a section, they can then unlock the section and allow editing access of the given section to other users. In this way, the "single document" model with section-level locked editing access solves the version control problem because, in effect, every user is inherently always editing the most recent version of the document. As discussed above, since data items are linked throughout the document with the their source values in a single source file, changes are automatically propagated throughout the document wherever they appear explicitly, as in a data table entry, or implicitly as, for example, contributing to a sum of multiple values.

Data and text entered by users of the disclosed systems and methods can be used in numerous ways. In a first example, a report based on a complete set of data and text can be generated. This report can take the form of an SEC filing generated in XBRL or EDGAR HTML format. In a second example, a smaller report for distribution in a business meeting can be generated based on a subset of the data and text of the complete report. In this example, a user is enabled to select pieces of the complete report (i.e., individual sections, pages, tables, paragraphs) to generate the smaller report (or "microfiling").

In a third example, a presentation can be generated in the form of slides for a public speaking situation by selecting pieces of the complete report (i.e., individual sections, pages, tables, paragraphs).

In the above examples, the user may select pieces of the complete report in a straightforward "cut and paste" or other fashion. The smaller reports or presentations, so generated, are represented, as before, through an XBRL representation in which data items are linked to their source values as in the case of the complete report. When a user selects pieces of data he/she is in effect selecting the various links associated with that data. The disclosed systems and methods seamlessly create the appropriate "taxonomy" of the XBRL "data model" associated with the newly created report or presentation. In effect, by cutting and pasting from the "visual document" the underlying systems and methods automatically construct the corresponding "data document" in the form of the XBRL representation having the correct taxonomy with links to the selected subset of data in the source document.

In more detail, the systems and methods according to the embodiments disclosed herein generate an XBRL "taxonomy fragment" from within a larger XBRL taxonomy when a user selects a set of facts or data, or an XBRL document fragment, from a larger report. The systems and methods thus eliminate the need for a user to select the underlying XBRL metadata associated with the set of facts or data. For example, when a user wishes to select a set of facts (e.g., the balance sheet) from a larger report or filing (e.g., Form 10-K), the user only needs to select the data of the balance sheet in the Form 10-K, not the underlying XBRL metadata of the balance sheet. Moreover, the generation of the XBRL taxonomy fragment facilitates the transfer of the XBRL document fragment without making reference to the larger XBRL taxonomy corresponding to the larger report.

When generating the XBRL taxonomy fragment corresponding to the set of facts selected by the user, the system extracts the concepts and links that are relevant to the XBRL document fragment from the larger XBRL taxonomy. This process may involve severing the links between the relevant concepts and the irrelevant concepts, which are concepts that are contained in the larger XBRL taxonomy but are not relevant to the XBRL document fragment. In effect, the XBRL taxonomy fragment contains a subset of the concepts and links in the larger XBRL taxonomy, since it does not necessarily link back to all the source values that are linked in the XBRL taxonomy of the larger report.

In the current example, when the user copies and pastes the balance sheet into another document, the system extracts the XBRL taxonomy fragment corresponding to the balance sheet from the originating XBRL taxonomy for the Form 10-K. The system maintains only the concepts and links relevant to the balance sheet and breaks the links between the concepts for the balance sheet and the concepts for other sections of the Form 10-K that are not necessary for the balance sheet, for example, the Description of Business, Risk Factors, and the Legal Proceedings. As a result, the XBRL taxonomy fragment of the balance sheet becomes separate and independent from the XBRL taxonomy of the Form 10-K. The user can thus easily transfer the balance sheet and its associated XBRL taxonomy fragment without making any reference to the larger XBRL taxonomy corresponding to the Form 10-K.

Further embodiments enable a user to create a presentation or a report and to publish it in such a way that others can access the report or presentation along with the underlying associated data. For example, in a first step, a user can generate a presentation or report based on a subset of a larger report by using a "cut and paste" or similar process. As described above, this process generates a corresponding "data model" in an XBRL representation having the correct taxonomy. The resulting XBRL representation or report and/or presentation can then be published on a particular server or cloud computing environment associated with a URL address. By providing the corresponding URL address, others may access the report or presentation.

In a further embodiment, access to the report or presentation, discussed above, can be facilitated through the use of a QR code that can be read by a smartphone or common computing device such as a tablet computer. In an embodiment system and method, a unique QR code can be generated along with the associated presentation or report. The QR code can then be distributed to others who can use it to access the report or presentation. For example, in an embodiment, a QR code can be generated that can be cut and pasted by the user into a slide presentation for display in a public speaking context. An audience member attending the presentation can take a photograph of the QR code and digitally access the presentation materials and any accompanying report(s) or data based on the QR code.

In a further embodiment, a secure QR code (SQR) or authenticated QR code (AQR) can be generated and provided along with a report or presentation. Typically, a QR code stores data corresponding to a URL address of a web site. As such, a typical QR code is susceptible to malicious attack. For example, a malicious entity can change or substitute a legitimate QR code for one that directs a user to a malicious website. In an embodiment, a QR code can be generated to include, not only information regarding a web site containing the desired content to be distributed, but also to contain a digital signature. By using an appropriate QR code reader (provided in an embodiment) a user can authenticate the web site encoded by the QR code based on the digital signature.

The above disclosed embodiments are described more fully with reference to the following figures.

FIG. 1 is a schematic illustration of an embodiment system 100, according to an embodiment. This system includes a user input device 104, an XBRL document editing system 106, a data store 108, and XBRL validation system 110, and a publishing system 112.

Using this embodiment system 100, a user is enabled to enter input data 102 using a standard user input device 104. The input device interacts with a document editing system 106 that enables the user to input text and numerical data using familiar spreadsheet and word processing tools. The document editing system 106 stores the data in a source file residing on a data store 108 that may be located on a server or cloud computing environment. The XBRL document editing system is configured to generate the "data model" in the form of an XBRL document. The XBRL validation system 110 enables the user to easily detect and correct errors in the XBRL document without the need to understand XBRL syntax. The editing system 106 further enables a user to generate a presentation or report from a larger document using a straightforward cut and paste process. The report or presentation can then be published using the publishing system 112. The publishing system 112 interacts with the editing system 106 and the data store 108 to generate a URL address for accessing the report or presentation as well as the underlying associated data. The publishing system 112 may also generate a secure authenticated QR code (AQR) 114 that can be further provided to others in order to access the report or presentation and associated data.

Figure 2:
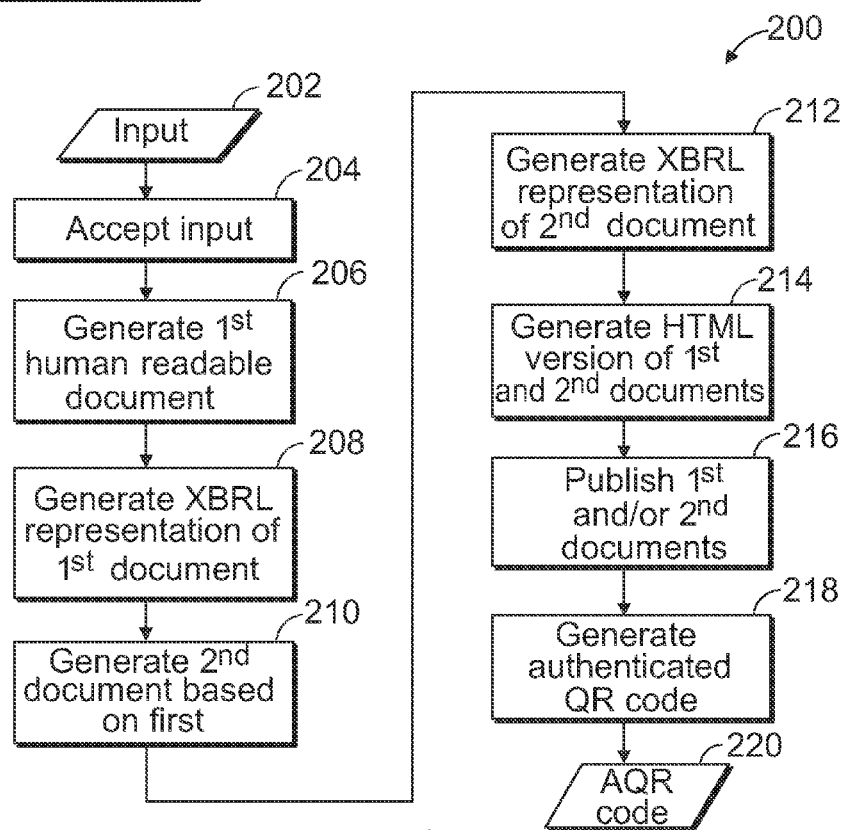
FIG. 2 is a flowchart illustrating a computer based method for generating and publishing XBRL based documents, according to an embodiment.

In a further embodiment, a computer-based method 200 is disclosed as illustrated in FIG. 2. In a first stage, the method 200 includes accepting 204 numerical and/or textual input 202 from at least one of: a user input device, a data file containing spreadsheet based data, and a data file containing word processor based data. In stage 206, a first human readable document including numerical and textual data is generated. In stage 208 a first XBRL representation of the first document is generated. In stage 210, a second human readable document based on the first document including a subset of the numerical and textual data from the first document is generated, wherein the second document is generated based on user input. In stage 212, a second XBRL representation of the second document is generated; this is the microfiling. In stage 214 an HTML representation of at least one of the first and second documents can be optionally generated. In stage 216, the documents are published so as to provide access to at least one of the first and second documents over the internet. In stage 218 a reference locator, such as a URL or visually encoded reference locator such as a QR or AQR code, is generated that provides validated access the at least one of the first and second documents.

The process of generating a presentation or report (also called a "microfiling") from a larger document, mentioned above in the context of FIGS. 1 and 2, is discussed more fully with reference to FIGS. 3-6 in the following. The extraction of the microfiling may have two degrees of scope: (1) a "technical minimum," and (2) a "logical minimum." The "technical minimum" refers to the minimum amount of information needed for presentation of the selected data only, and the "logical minimum" refers to the minimum amount of information needed for presentation of the selected data in user-selected interpretive context(s). The information used to create the microfiling is selected by the user from the complete report in a straightforward "cut and paste" or similarly intuitive fashion. The general process uses information gleaned from the selected facts to identify the relevant details from the originating XBRL taxonomy (which serves as the reference source for the generation of the microfiling).

The following provides a number of definitions and assumptions associated with the process of generating a microfiling. A navigation key (i.e., "navkey") is used to reference all uniquely computer-referenceable XBRL values. The values are stored in documents that are collectively referred to as the "origin locations." Each origin location exists within a human-readable, visually formatted "document" section. A navkey also identifies additional data describing the XBRL "fact" related to a given value, if such a fact exists. Every document section containing facts is associated to a section or sections of a XBRL "originating taxonomy." The XBRL code identifies each taxonomy section by an "extended link".

A fact's navkey provides access to the extended link that is the primary metadata description of the fact. This is computationally significant information because a fact may be associated with several extended links, each representing a different "interpretative context." Therefore, if there are multiple extended links describing a fact, the primary context needs to be known if the microfiling is to contain the appropriate interpretive context.

An "XBRL filing" consists of 6 related XML files: (1) a schema file, (2) a presentation linkbase, (3) a calculation linkbase, (4) a definition linkbase, (5) a label linkbase, and (6) a data file.

Figure 3:
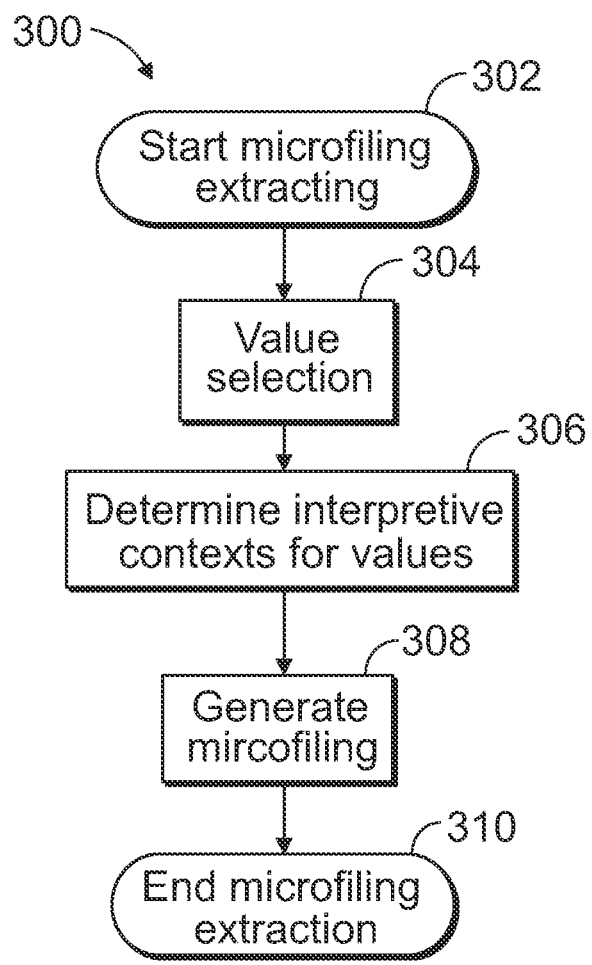
FIG. 3 is a flowchart illustrating a process of microfiling extraction, according to an embodiment.

FIG. 3 is a flowchart 300 of the microfiling extraction process, according to an embodiment. In stage 302 a user initiates the process of microfiling extraction. This may be initiated by a user using a mouse to interact with a graphical user interface. In flowchart 400, the user selects information from the complete report to be included in the microfiling. The information can be selected using a mouse to select the desired information, or other selection mechanism, detailed below in [0045]. Flowcharts 500 and 600 relate to internal processing of the selected information. In flowchart 500, interpretive contexts are determined for selected values and in flowchart 600, the microfiling is generated. Stage 310 concludes the process of microfiling extraction. Flowcharts 400, 500, and 600 are described in greater detail with respect to FIGS. 4-6, respectively, in the following.

Figure 4:
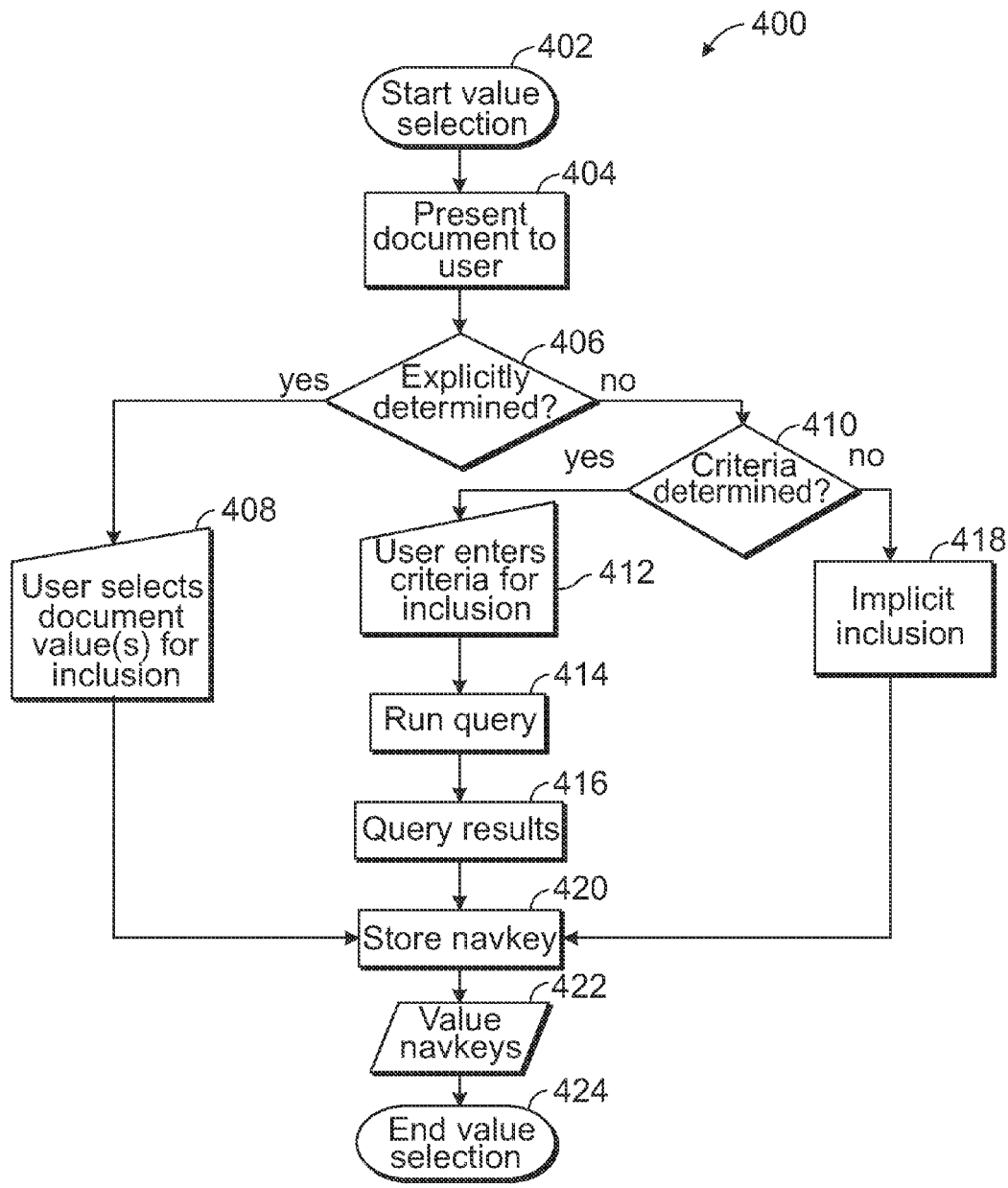
FIG. 4 is a flowchart illustrating the process of value selection, which identifies XBRL tagged value(s) for inclusion in the microfiling, according to an embodiment.

FIG. 4 is a flowchart 400 illustrating the process 400 of value selection, which identifies XBRL tagged value(s) for inclusion in the microfiling, according to an embodiment. In stage 402, the process of value selection is initiated by a user. After the value selection process is started in stage 402, the document is presented to the user on a graphical user interface in stage 404. The user is the provided with an opportunity to select values from the document. Facts for inclusion in the microfiling are then chosen based on the values selected by the user.

Values can either be determined implicitly or explicitly. Explicit determination of values refers to the process whereby a user selects specific information from the document through cutting and pasting or similarly intuitive fashion. In contrast, a user may implicitly select values based on various criteria. Stage 406 represents a decision point in which a user can choose to select values implicitly or explicitly. For those values which are explicitly determined, the user selects 408 document value(s) for inclusion through existing document editor selection mechanisms.

In stage 406, if the user chooses to not include values explicitly, a second decision point is reached in stage 410. At this stage 410, the user is given the opportunity to decide whether to select values using a query based selection method. For those values that are query determined, the user is given an opportunity, in stage 412, to specify various criteria for value selection. Based on the criteria entered by the user in stage 412, a query of available values from the document is executed in stage 414. Based on the query executed in stage 414, a number of query results are obtained in stage 416. These comprise a number of navkeys.

If in stage 410 the user chooses to not include values based on a query, then values are chosen implicitly in stage 418; in this case, all values in the active document section are selected.

In stage 420 the navkey for each selected value is stored by adding it to the complete list of stored navkey values. The stored values include the complete list of all document values that will drive the inclusion of facts in the microfiling. As a result of the value selection process 400, the system compiles a data set 422 containing the navkey for each selected value. The value selection process 402 then concludes at stage 424. Interpretive contexts for the selected values are then determined (as discussed below with reference to FIG. 5).

Figure 5:
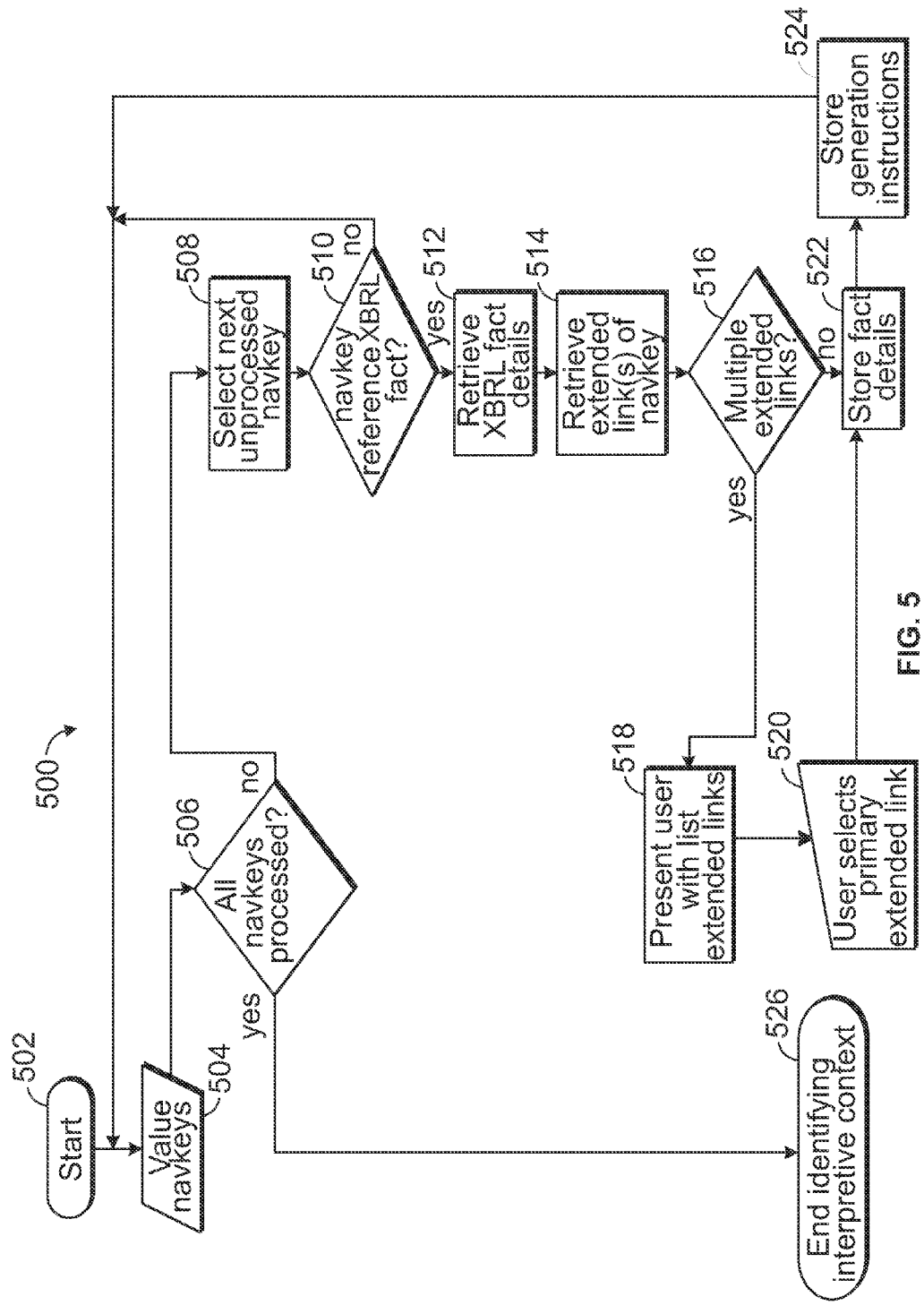
FIG. 5 is a flowchart illustrating the process whereby the interpretive context is identified, according to an embodiment.

FIG. 5 is a flowchart illustrating the process 500 whereby the interpretive context is identified. In stage 502, the process of identifying interpretive context is initiated. The process illustrated by the flowchart 500 is based on the previously determined navkeys 504. Each of the navkeys 504 is processed to determine the interpretive context. Decision point 506 represents a loop whereby each key is processed. When all navkeys 504 have been processed, the loop ends at stage 526. If in stage 506 it is determined that not all navkeys have been processed, an unprocessed navkey is selected in stage 508. Stage 510 determines whether or not the selected navkey references an XBRL fact. If the navkey selected in stage 508 does not reference an XBRL fact, then the loop returns to select the next navkey 504.

If in stage 510 the navkey is found to reference an XBRL fact, then fact details are retrieved in stage 512. Fact details can include: the fact value, an XBRL element, a context ID, and a date ID. Further, if the XBRL fact is a numeric XBRL element, the fact details can include a unit ID or the unit's measure that further describes the numeric value. In stage 514, an extended link or links associated with this fact are retrieved.

Stage 516 represents a decision point in which it is determined whether or not multiple extended links are associated with the chosen navkey. If it is determined in stage 516 that multiple extended links are associated with the navkey, then the user is presented with a list of associated extended links in stage 518. In stage 520 the user is provided an opportunity to select a primary extended link. The user may also be provided with an opportunity to select additional extended links for inclusion in the interpretive context.

In stage 522, an association is made between each navkey and the "roleURI" of each extended link selected by the user. At this stage, all fact details and the interpretive context are stored.

At stage 524 the facts and their interpretive context are stored as "generation instructions." Thus, at this stage, the system has a data set containing the navkey for each selected value and the extended link(s) of each value's interpretive context ("generation instructions"). The process 500 of determining the interpretive context is then terminated at stage 526 once all navkeys have been processed.

Figure 6:
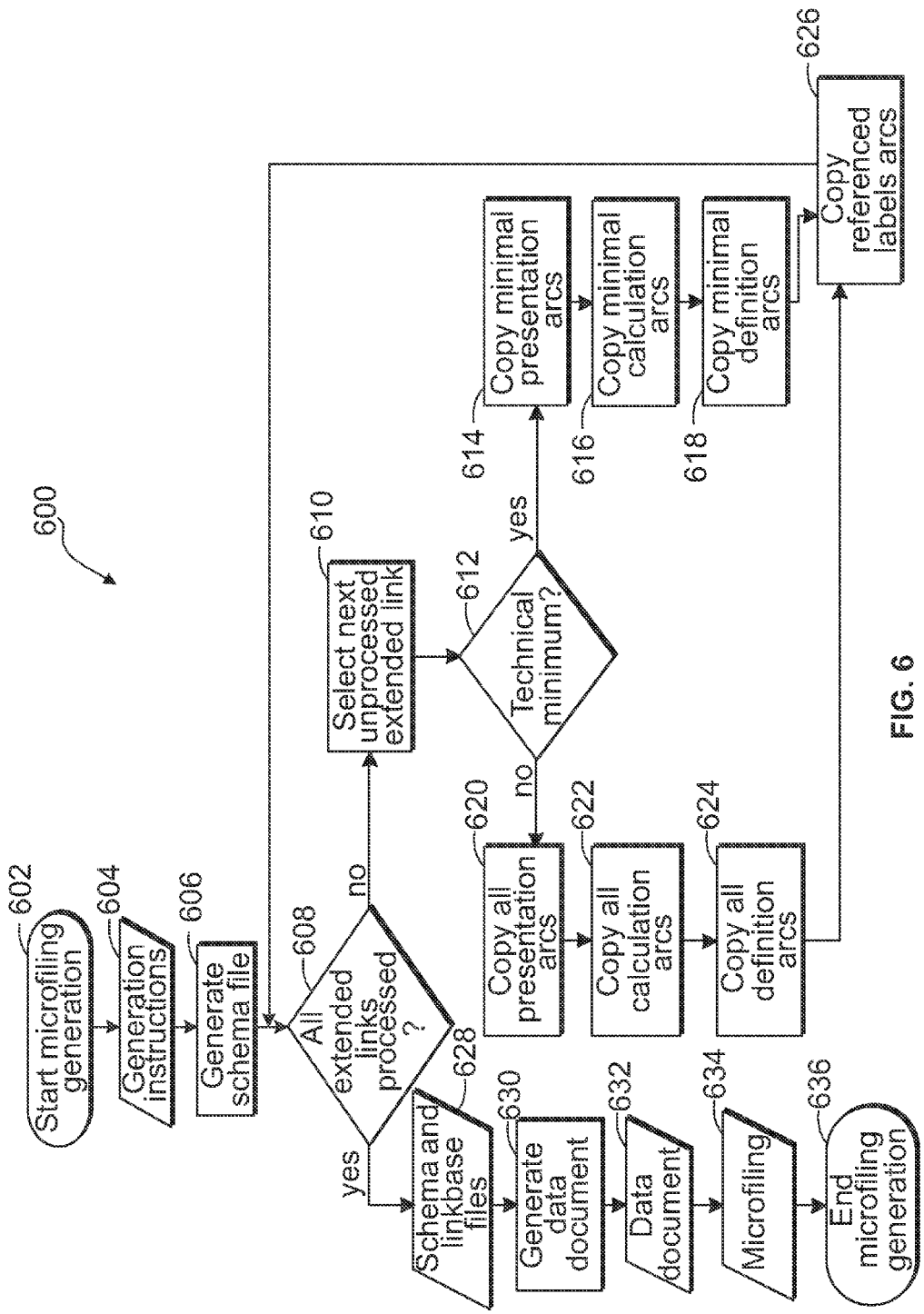
FIG. 6 is a flowchart illustrating the process of generating a microfiling, according to an embodiment.

FIG. 6 is a flowchart illustrating the process 600 of generating a microfiling, according to an embodiment. In stage 602, the process of generating a microfiling is initiated, based on the generation instructions 604 generated in stage 524. In an embodiment, the resulting microfiling 634 may comprise a set of XBRL documents containing a schema file, linkbases, and data document.

In stage 606, the process of generating a schema file and linkbases is initiated at stage 606 and terminates at stage 628. The schema file has support for the microfiling. This support may include: (1) extended link declarations from the generation instructions (with duplicates removed), and (2) an extension element definition for each fact tagged with extension elements (with duplicates removed).

The stages (608-628) are concerned with generating "linkbases" related to extended links contained in generation instructions. Stages 608-626 represent a loop with two branches, one if the technical minimum scope is to be used and the second if the logical minimum scope is to be used. In the following, a "copy" operation uses the "originating taxonomy" as its source, and specifically the section within the same extended link as identified by the roleURI as in the generation instructions.

Stage 608 represents a decision point in the loop to determine whether or not all extended links associated with the generation instructions have been processed. If it is determined, in stage 608, that all extended links in the generation instructions have been processed, then the generation of the linkbase files is complete at stage 628.

On the other hand, if in stage 608 it is determined that not all extended links have been processed, then an unprocessed extended link is selected in stage 610 for processing.

Stage 612 represents a decision point wherein it is determined whether or not the technical minimum scope is to be used. If the technical minimum scope is to be used, then the presentation linkbase is generated in stage 614. This involves generating the extended link structure. The extended link structure is generated by copying over selected presentation arcs from the presentation hierarchy of the same extended link roleURI. This is carried out from the "root" of the hierarchy down, including each axis and its dimension default even if not explicitly used for any selected fact, and all other elements going only as far down the hierarchy as required to include every element in the generation instructions for that extended link.

In stage 616 the calculation linkbase is generated. This involves copying over a minimal skeleton of a calculation linkbase without any calculation arcs.

In stage 618, the definition linkbase is generated for the processed extended link. This involves copying over the definition hierarchy from the definition linkbase of the originating taxonomy for the extended link structure of the same extended link roleURI. This is carried out from the root of the hierarchy down, retaining all elements with the exception of those in "a domain-member arcrole" relationship. In that case, only those arcs are kept which reference elements referenced by selected facts.

If in stage 612 it is determined that the technical minimum scope is not to be used then the logical minimum scope is to be used and the loop branch represented by stages 620, 622, and 624 is selected. In this case, in stage 620 all presentation arcs from the originating taxonomy, and for the extended link structure of the same extended link roleURI, are copied into the generated presentation linkbase. In stage 622 all calculation arcs from the originating taxonomy, and for the extended link structure of the same extended link roleURI, are copied into the generated calculation linkbase and in stage 624 all definition arcs from the originating taxonomy, and for the extended link structure of the same extended link roleURI, are copied into the generated definition linkbase.

Stage 626 represents the generation of the label linkbase. This is generated by including in the linkbase, for every element in the microfiling's presentation linkbase, the label arc for the standard label and the preferred label (if any) in that extended link (duplicates removed).

The processes represented by stages 608-626 are repeated for each extended link from the generation instructions.

A data document is generated at stage 630 using the generation instructions from stage 604. The data document has support for the microfiling. This support may include: (1) reference to the schema file at stage 606; definitions for each "contextID" necessary to support the XBRL facts contained in the microfiling (duplicates removed), and the declaration of XBRL facts themselves.

Once all of the extended links have been processed at stage 626 and the data document is created at stage 632, the result is the set of XBRL documents that may comprise the microfiling 634 and the process terminates with stage 636.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism," "element," "unit," "structure," "means," and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A computer-implemented system, comprising:
    a user input device, configured to receive numerical and textual input;
    an editing system, configured to:
        receive input from an input device based on existing spreadsheet and word processing systems;
        generate a first document including numerical and textual data;
        generate an XBRL representation of the first document;
        generate a second document based on the first document including a subset of the numerical and textual data from the first document and an interpretive context determined by performing the following operations:
            retrieving fact details for a navkey that references an XBRL fact;
            retrieving one or more extended links associated with the selected XBRL fact; and
            receiving a user-selection of one or more extended links that are associated with the navkey;
        generate an XBRL representation of the second document; and
        generate an HTML representation of at least one of the first and second documents;
    a non-transitory data storage medium, configured to store first and second source files associated with the respective first and second documents;
    a validation system, configured to validate the XBRL representations of the first and second documents and to identify and correct errors in the XBRL representations of the first and second documents; and
    a publishing system, configured to:
        provide access to at least one of the first and second documents over the internet; and
        generate a reference locator comprising a URL or a QR code to be used to access the at least one of the first and second documents.

2. The system of claim 1, wherein the editing system is further configured to generate an XBRL representation of the second document comprising at least one of: a schema file; a presentation linkbase; a calculation linkbase; a definition linkbase; a label linkbase, and a data document.

3. The system of claim 1, wherein the user input device is a graphical user interface configured to receive numerical and textual input that is selected from the first document.

4. The system of claim 1, wherein the editing system is further configured to receive numerical and textual input from a user, wherein the input is implicitly selected, explicitly selected, or selected based on a query.

5. The system of claim 1, wherein the editing system is further configured to determine interpretive contexts for selected values, wherein the determining comprises:
retrieving fact details for a navkey that references an XBRL fact, wherein the fact details include at least one of: a fact value; an XBRL element; a context ID; a date ID; and a unit ID;
retrieving an extended link associated with an XBRL fact;
determining whether multiple extended links are associated with a navkey;
receiving a selection, from a user, of a primary extended link when extended links are associated with a navkey;
determining an association between each navkey and a roleURI of each extended link selected by the user; and
storing all fact details and the interpretive context as generation instructions.

6. The system of claim 1, wherein the editing system is further configured to:
generate the XBRL representation of the second document based on at least one of: a technical minimum scope, and a logical minimum scope,
wherein the technical minimum scope refers to the minimum amount of information needed for presentation of the selected data only, and the logical minimum scope refers to the minimum amount of information needed for presentation of the selected data in user-selected interpretive context(s).

7. A processor-based method, comprising:
receiving, by a processor, at least one of numerical and textual input from at least one of: a user input device, a data file containing spreadsheet based data, and a data file containing word processor based data;
generating, by the processor, a first human readable document including numerical and textual data;
generating an XBRL representation of the first document;
generating a second human readable document based on the first document including a subset of the numerical and textual data from the first document and an interpretive context determined by performing the following operations:
retrieving fact details for a navkey that references an XBRL fact;
retrieving one or more extended links associated with the selected XBRL fact; and
receiving a user-selection of one or more extended links that are associated with the navkey;
generating an XBRL representation of the second document;
generating an HTML representation of at least one of the first and second documents when a user selectable option is selected;
storing first and second source files associated with the respective first and second documents;
automatically validating, by the processor, the XBRL representations of the first and second documents;
providing access to at least one of the first and second documents over the internet; and
generating a reference locator to be used to access the at least one of the first and second documents, wherein the reference locator can comprise a URL or a QR code.

8. The method of claim 7, further comprising:
generating an XBRL representation of the second document comprising: a schema file, a presentation linkbase, a calculation linkbase, a definition linkbase, a label linkbase, and a data file.

9. The method of claim 7, further comprising:
receiving numerical and textual input that is selected from the first document.

10. The method of claim 7, further comprising:
receiving numerical and textual input from a user that is implicitly selected, explicitly selected, or selected based on a query.

11. The method of claim 7, further comprising:
determining interpretive contexts for selected values, wherein the determining comprises:
retrieving fact details for a navkey that references an XBRL fact, wherein the fact details include at least one of: a fact value; an XBRL element; a context ID; a date ID; and a unit ID;
retrieving an extended link associated with an XBRL fact;
determining whether multiple extended links are associated with a navkey;
receiving a selection, from a user, of a primary extended link when extended links are associated with a navkey;
determining an association between each navkey and a roleURI of each extended link selected by the user; and
storing all fact details and the interpretive context as generation instructions.

12. The method of claim 7, further comprising:
generating the XBRL representation of the second document based on at least one of: a technical minimum scope, and a logical minimum scope,
wherein the technical minimum scope refers to the minimum amount of information needed for presentation of the selected data only, and the logical minimum scope refers to the minimum amount of information needed for presentation of the selected data in user-selected interpretive context(s).

13. A non-transitory computer readable storage medium having program instructions stored thereon that, when executed by a processor, cause the processor to carry out a computer based method, the method comprising:
receiving at least one of numerical and textual input from at least one of: a user input device, a data file containing spreadsheet based data, and a data file containing word processor based data;
generating a first human readable document including numerical and textual data;
generating an XBRL representation of the first document;
generating a second human readable document based on the first document including a subset of the numerical and textual data from the first document and an interpretive context determined by performing the following operations:
retrieving fact details for a navkey that references an XBRL fact;
retrieving one or more extended links associated with the selected XBRL fact; and
receiving a user-selection of one or more extended links that are associated with the navkey;
generating an XBRL representation of the second document;

generating an HTML representation of at least one of the first and second documents when a user selectable option is selected;

storing first and second source files associated with the respective first and second documents;

automatically validating the XBRL representations of the first and second documents;

providing access to at least one of the first and second documents over the internet; and generating a reference locator to be used to access the at least one of the first and second documents, wherein the reference locator can comprise a URL or a QR code.

14. The storage medium of claim 13, further comprising program instructions that, when executed by the processor, cause the processor to:

generate an XBRL representation of the second document comprising: a schema file; a presentation linkbase; a calculation linkbase; a definition linkbase; a label linkbase, and a data file.

15. The storage medium of claim 14, further comprising program instructions that, when executed by the processor, cause the processor to:

generate the schema file having at least one of: (1) extended link declarations from the generation instructions, (2) an extension element definition for each fact tagged with extension elements, and extension element definitions for each "contextID" that is defined referencing an extension element.

16. The storage medium of claim 13, further comprising program instructions that, when executed by the processor, cause the processor to:

receive numerical and textual input that is selected from the first document.

17. The storage medium of claim 13, further comprising program instructions that, when executed by the processor, cause the processor to:

receive numerical and textual input from a user that is implicitly selected, explicitly selected, or selected based on a query.

18. The storage medium of claim 13, further comprising program instructions that, when executed by the processor, cause the processor to:

determine interpretive contexts for selected values, wherein the determining comprises:

retrieving fact details for a navkey that references an XBRL fact, wherein the fact details include at least one of: a fact value; an XBRL element; a context ID; a date ID; and a unit ID;

retrieving an extended link associated with an XBRL fact;

determining whether multiple extended links are associated with a navkey;

receiving a selection, from a user, of a primary extended link when extended links are associated with a navkey;

determining an association between each navkey and the roleURI of each extended link selected by the user; and storing all fact details and the interpretive context as generation instructions.

19. The storage medium of claim 18, further comprising program instructions that, when executed by the processor, cause the processor to:

generate the XBRL representation of the second document based on at least one of: a technical minimum scope, and a logical minimum scope, wherein the technical minimum scope refers to the minimum amount of information needed for presentation of the selected data only, and the logical minimum scope refers to the minimum amount of information needed for presentation of the selected data in user-selected interpretive context(s).

20. The storage medium of claim 19, further comprising program instructions that, when executed by the processor, cause the processor to:

generate an extended link structure when the XBRL structure is based on the technical minimum scope, wherein the generating comprises:

copying over selected presentation arcs from a presentation hierarchy of the same extended link roleURI, wherein the copying is performed from the root of the hierarch down, including each axis and its dimension default even if not explicitly used for any selected fact, and all other elements going only as far down the hierarchy as required to include every element in the generation instructions for that extended link;

copying over the definition hierarchy from the definition linkbase of the originating taxonomy for the extended link structure of the same extended link roleURI, wherein the copying out from the root of the hierarchy down, retaining all elements with the exception of those in a "domain-member arcrole" relationship, wherein only those arcs are kept which reference elements referenced by selected facts;

copying over the calculation hierarchy from the calculation linkbase of the originating taxonomy, wherein the copying over minimal skeleton of a calculation linkbase without any calculation arcs; and copying over the label linkbase, wherein for every element in the microfiling's presentation linkbase, the label arc for the standard label and the preferred label in that extended link it copied.

21. The storage medium of claim 19, further comprising program instructions that, when executed by the processor, cause the processor to:

generate an extended link structure when the XBRL structure is based on the logical minimum scope, wherein the generating comprises:

copying over selected presentation arcs from a presentation hierarchy of the same extended link roleURI, wherein the copying is performed for all presentation arcs in that extended link;

copying over the definition hierarchy from the definition linkbase of the originating taxonomy for the extended link structure of the same extended link roleURI, wherein the copying is performed for all definition arcs in that extended link;

copying over the calculation hierarchy from the calculation linkbase of the originating taxonomy, wherein the copying is performed for all calculation arcs in that extended link; and copying over the label linkbase, wherein for every element in the microfiling's presentation linkbase, the label arc for the standard label and the preferred label in that extended link it copied.

* * * * *